United States Patent [19]
Bopst, III

[11] 3,732,623
[45] May 15, 1973

[54] ROTARY MOVEMENT DISTANCE MEASUREMENT DEVICE

[76] Inventor: John H. Bopst, III, 409 Chalfonte Drive, Catonsville, Md. 21228

[22] Filed: Aug. 19, 1971

[21] Appl. No.: 173,111

[52] U.S. Cl. ................................................. 33/141 R
[51] Int. Cl. ............................................... G01b 3/12
[58] Field of Search........................ 33/141, 166, 129, 33/132, 139; 235/71, 86, 125, 119, 76

[56] References Cited

UNITED STATES PATENTS

| 3,516,164 | 6/1970 | McCormick | 33/141 F |
| 1,877,061 | 9/1932 | Schroll | 33/141 R |
| 537,082 | 4/1895 | Stuart | 33/139 |
| 2,484,151 | 10/1949 | Brownell | 33/141 F |
| 437,065 | 9/1890 | Wells | 33/141 R |

FOREIGN PATENTS OR APPLICATIONS 309,432  11/1918  Germany .......................... 33/141 R Primary Examiner—Harry N Haroian
Attorney—John F. McClellan, Sr.

[57] ABSTRACT

A rolling-contact adding and subtracting distance measurer comprising a pair of differently graduated endless tapes driven by unequal size sprocket-pulleys integral with a drive wheel rotatively mounted in a palm-sized case, with a portion of the wheel rim protruding from the bottom of the case; idlers carry the tapes in a flat run past an observation window in the top of the case; anti-tip rollers keep the case aligned with the surface to be measured in a typical embodiment.

3 Claims, 8 Drawing Figures

PATENTED MAY 15 1973　　　3,732,623
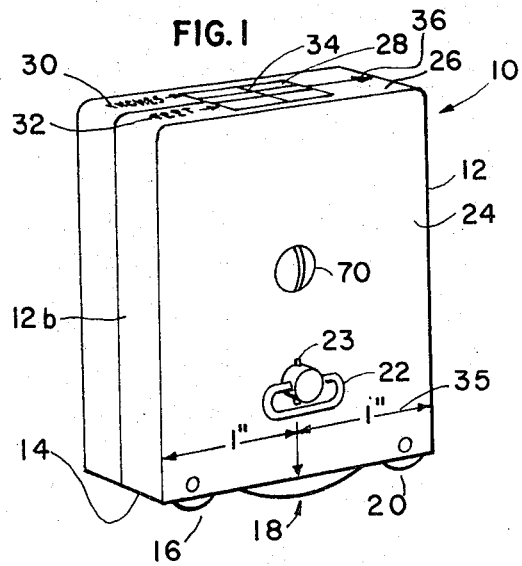
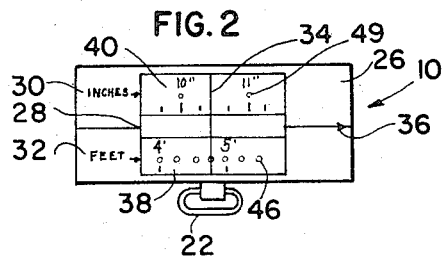
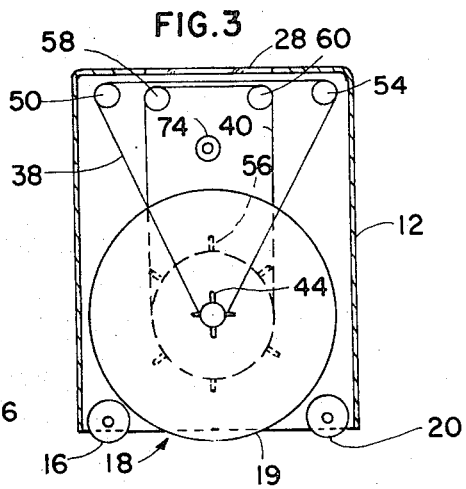
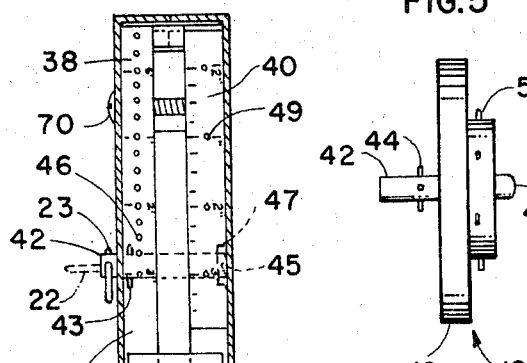
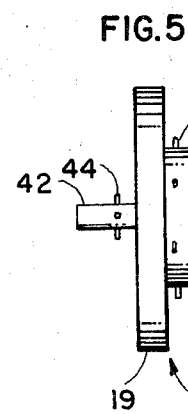
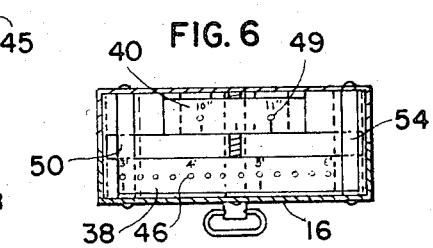
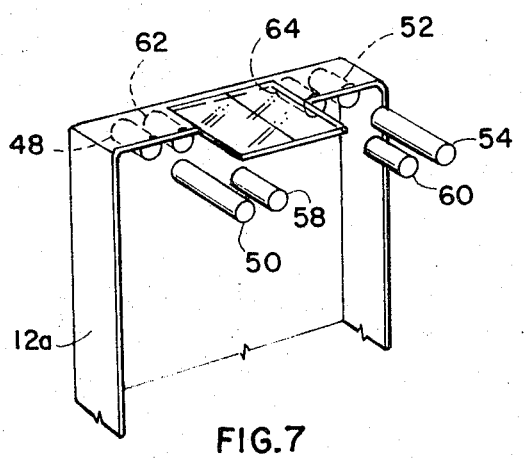
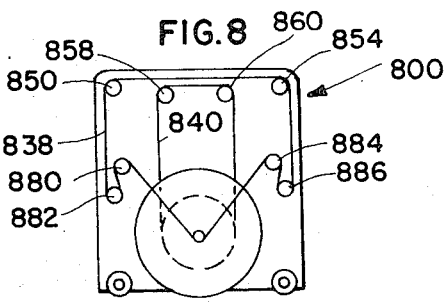
INVENTOR
JOHN H. BOPST, 3RD
ATTORNEY
John F. McClellan Jr.

ROTARY MOVEMENT DISTANCE MEASUREMENT DEVICE

This invention relates generally to measuring devices and specifically to instruments for making linear measurements on surfaces.

Extensible tapes such as the common 6-foot extensible metal tape have been the most widely used devices for the purpose to the present. However, these are relatively expensive, easily damaged and heavy. It is well known that the spring-return feature is tricky and sometimes makes deployment difficult and even dangerous through unexpected flyback.

Rolling devices, on which the present invention is a special, new, and substantial improvement have all had numerous drawbacks in the past. For example, such devices have been supplied in the form of large wheels with graduated circumferences or geared counters.

To reduce wheel size, endless tapes or belts have been suggested for use in conjunction with wheeled devices. Long handles or elongated casings have been thought particularly necessary, in the endless-tape versions of these devices to provide room for the very long belts felt essential for accuracy.

These considerations have at the same time increased cost and decreased flexibility of use, so that the market potential for endless-tape linear measuring instruments has not been realized.

A principal object of the present invention is to provide an endless tape linear measuring instrument which equals and in some cases surpasses extensible tapes in accuracy, which is compact enough for pocket carriage, which weighs only a small fraction of the weight of ordinary extensible tape devices, and which can be manufactured and sold at a fraction of the cost.

The invention, in typical embodiment, includes a differentially graduated pair of equal length tapes, differentially driven by a unitary member which includes a roller for engagement with a surface to be measured; the tapes are deployed over idlers in a special way to assure parallax-free readout.

The above and other advantages and objects of this invention will be more readily understood after examination of the following description, including the drawings, in which:

FIG. 1 is a perspective view of the invention in the position of measuring an object beneath it;
FIG. 2 is a plan view;
FIG. 3 is a side elevation in partial section;
FIG. 4 is an end elevation in partial section;
FIG. 5 is a detail showing a rotary member;
FIG. 6 is a plan view in partial section;
FIG. 7 is an assembly detail in perspective; and
FIG. 8 is a diagram similar to FIG. 3.

In the Figures, which will now be referred to in detail, like numbers denote like parts.

FIG. 1 shows the exterior of the invention 10 in perspective.

Operation of the instrument to make a measurement requires merely that the instrument be rolled across the surface to be measured, in the correct direction, on the rolling members projecting from the lower part of the instrument shown in the Figure. Details of operation of the parts relative to each other are given near the end of this specification, following the last Figure description.

Continuing with FIG. 1, case 12, which houses the working parts of the invention, is generally rectangular in shape and is preferably palm-sized in that the overall dimensions are suited for carriage of the device in the palm of a hand. The case 12 is open at the bottom, and portions of three members 16, 18, 20 which are rotatively mounted inside the case, protrude through the bottom opening 14. A reset key 22 extends through one side wall 24 of case 12. The top 26 of the case has a window 28 centrally positioned in it through which the distance readings are observed.

Notations designated by reference numerals 30, 32 indicate the units in which the device is calibrated and are provided as shown adjacent one end of the window. The underside of the window bears a fiducial mark 34 across the center, parallel with the ends of the case. The case has side markings 35 near the bottom indicating the center of the case and that the distance from the center to either end is one inch, as shown.

As will be seen, this is an additive/subtractive device, depending on the direction of operation. Arrow 36, marked on the top, indicates the direction of positive or additive movement. All case markings can be molded or printed or both molded and printed. They can also be decals.

FIGS. 2 and 3 show respectively the graduated members of the device and the means by which the graduated members operate.

In FIG. 2, a plan view of the case top 26, interior components 38, 40 appear through the window 28. These are the visible portions of a pair of endless tapes, which in the embodiment shown are respectively graduated in feet and inches, as indicated by the markings 30, 32.

Each of the tapes has a row of sprocket drive holes, designated respectively at 46 and 48. The purpose of these is explained below in reference to FIG. 3.

FIG. 3, a side elevation with the case 12 in partial section, shows the interior construction of the instrument. Drive wheel 18 is in part a traction wheel 19. It drives the measuring tapes by rolling contact of the traction wheel with the surface to be measured. The traction wheel circumference is made as great as can be fitted in the case to provide mechanical advantage for driving, and to roll smoothly over rough surfaces. The periphery is preferably coated with a frictional substance such as colloidal silica mixed with thinner and varnish to avoid slippage error. If the wheel is molded, as preferred, the mold can be appropriately sandblasted to provide a roughened traction wheel rim to give the same effect.

Proper case positioning is assured by rollers 16 and 20, which are rotatively mounted at the bottom corners of the case 12. These prevent the case from tipping about the axis of rotation of the drive wheel, and because of their length, stabilize the case laterally also.

Since the peripheries of the three rolling elements 16, 18, 20 are aligned almost in-plane to assure surface contact by the drive wheel, the contact surfaces of rollers 16 and 20 are made of slightly resilient material such as rubber, or the rollers are otherwise made slightly yielding.

As will be seen in FIGS. 4 and 5, the drive wheel 18 is an axled unitary structure having provision for the several functions which it simultaneously performs. Axle 42 is rotatively journalled in the cover 12, according to ordinary practice, as shown in FIG. 4. The end 45 of the axle which is away from the winding key is rounded and is journalled in a blind socket 47. The opposite end is retained in the case by a pin 43 which bears on the case wall opposite the socket.

The inner portion of axle 42 has a fixed array of protrusions forming a relatively small diameter cogged pulley or sprocket 44, which engages the holes 46 in endless tape 38, shown in FIGS. 2, 4 and 6.

FIGS. 3, 4 and 6 show the idlers over which endless tape 38 is tautly looped at the respective upper corners of the case, to achieve the flat parallel run of the tape past window 28, as previously described. The idlers are preferably two-part with fixed axles 48, 52 supporting rotative sleeves 50, 54 to reduce friction drag on the tape, as will be seen in FIG. 7.

FIGS. 3 and 5 show a similar mounting and drive for tape 40. Sprocket 56, which is also a unitary part of the drive wheel 18, is relatively larger in diameter than sprocket 44. It engages holes 49 in tape 40 which is tautly looped over idlers 58, 60 in similar manner to the other tape. These idlers are also preferably of two-part low friction construction, as will be seen at 58, 60, 62, 64, FIG. 7.

The tapes are preferably of equal length, lowering manufacturing costs and making inspection and assembly easier.

FIG. 4 shows the side aspect of the tape mounting, and indicates the relation of the reset key 22 to axle 42, to which it is affixed as by a pin 23.

FIG. 5 indicates a preferred arrangement with the sprockets on opposite sides to the traction wheel 19.

FIG. 6 shows, in plan, the disposition of tape 38 over idlers 50, 54.

FIG. 7 is an exploded-view detail to be taken in conjunction with FIGS. 1, 3 and 4, as showing the extremely simple but effective assembly of the instrument in preferred embodiment. The case is formed in two halves, 12a and 12b, 12b being shown in FIG. 1. The assembly sequence is preferably as follows: the idler sleeves and the rollers are fitted in place, the tapes are looped over the not yet assembled drive wheel and then over the idlers, the drive wheel is then assembled to casing half 12a, and the other casing half is installed. The reset key is attached to the shaft and the assembly is secured together, as by screw 70 which passes through a hole in casing half 12b and engages lug 74, FIG. 3, which is integral with the interior of casing half 12a, completing assembly.

Window 28 is preferably pre-assembled by cementing or otherwise to one casing half.

The casing halves can be made to snap together an assembly by provision of bosses in one part adapted to engage recesses in the other part, in which case the screw can be dispensed with.

Thermoplastic material such as high density polyethylene or polystyrene, is preferably used for the casing, drive wheel, roller, and idler sleeves. These units are preferably of injected molded construction. The tapes are preferably of spunbonded olefin. This material is inexpensive but well suited for the purpose. The window can be of transparent polystyrene with the fiducial mark integrally formed in it or printed on it.

In operation, the instrument is so proportioned that two complete rotations of the traction wheel in the embodiment described move the tape 38 a total of one inch. The graduations of this tape recycle to zero at the end of a 6-foot indication. The faster moving, expanded-scale tape 40, operates in synchronism with the other tape and recycles to zero at the end of each 12 inch indication. In the embodiment shown, the circumference of the drive wheel is 6 inches, making the diameter of the wheel less than 2 inches, and allowing the case length to be the even 2 inches requisite for easy offset allowances. If metric or other graduations are used, adjustments of proportions are made, but in any case, because of the flexibility of the unique idler disposition, the device can be kept compact by altering the diameters and spacings of the operating parts. The flat, close-to-the window, parallax-free relation of the tapes, and the generally great length of the tapes as extended by the idlers, remains substantially unchanged.

FIG. 8 diagrams the tape-installation portion of an embodiment 800 having extra idlers 880, 882, 884, 886, permitting the use of a much longer tape 838, with comparably increased measuring capacity. Symmetrical disposition of all idlers equals tension on the tape, promotes equal thermal expansion and measuring accuracy, and makes assembly and checking more precise. It will be appreciated that FIG. 8 is exaggerated as is FIG. 3 in order to show the separate run of each tape past the window more clearly. In actuality, the parallel runs of the tape in each case are in the same plane.

In the light of the above description, many advantages can be noted in addition to those set forth in the introduction. Through provision of the window in the top, vision remains unobscured regardless of whether the case is reversed; this provision is particularly useful also in making inside measurements, such as in drawers.

Accurate measurements are easily made using one hand.

All parts, including the tapes, are protected from damage by the housing.

Error through tape slippage is eliminated by provisions of the one-piece drive wheel assembly and the sprocket arrangement.

If a measurement is overshot this is easily corrected by retracing to the point originally intended.

Obviously many modifications and variations of the present invention are possible in light of the above teachings. It is, therefore, to be understood that within the scope of the appended claims the invention may be practiced otherwise than as specifically described.

What is claimed and desired to be obtained by United States Letters Patent is:

1. A rotary movement distance measurement device comprising: drive wheel means including a traction wheel, a first sprocket pulley smaller than the traction wheel, a second sprocket pulley smaller than the first sprocket pulley, an axle co-axially integral with all said traction wheel, first sprocket pulley and second sprocket pulley; case means having journal means arranged for mounting the axle with a portion of the drive wheel means protruding below the case means bottom, first and second yielding rollers respectively mounted at the lower ends of the casing means with the axes thereof parallel with said drive wheel means axle and with the periphery of each roller protruding below the case means substantially in-plane with the periphery of the traction wheel, said case means having a window in the top thereof, idler means affixed to the interior of the case means proximate each end of said window, first tape means engaging the first sprocket pulley and engaging idler means proximate each end of the case means window, second tape means engaging the second sprocket pulley and engaging idler means adjacent each end of the case means window, and a fiducial mark on the case means window transverse to the tape means, whereby all said tape means are disposed proximately across the case means window parallel with each other and with the case means window.

2. A distance measurement device as recited in claim 1, wherein said first and second tape means are of equal length.

3. A distance measurement device as recited in claim 1, wherein said first and second tape means are of unequal length, wherein said idler means are symmetrically positioned, within the case means, wherein additional symmetrically positioned idler means are provided within the case means, and wherein the longer of said tape means is symmetrically disposed to engage the additional idler means.

* * * * *